United States Patent [19]
Hashimoto

[11] Patent Number: 6,086,498
[45] Date of Patent: Jul. 11, 2000

[54] TENSIONER LEVER WITH RESIN SHOE

[75] Inventor: Hiroshi Hashimoto, Saitama-ken, Japan

[73] Assignee: Tsubakimoto Chain Co., Osaka, Japan

[21] Appl. No.: 09/048,350

[22] Filed: Mar. 26, 1998

[30] Foreign Application Priority Data

Mar. 24, 1997 [JP] Japan ..................................... 9-075516

[51] Int. Cl.⁷ ................................ F16H 7/08; F16H 7/18
[52] U.S. Cl. ............................................ 474/111; 474/140
[58] Field of Search ..................... 474/101, 109, 474/111, 136, 138, 140

[56] References Cited

U.S. PATENT DOCUMENTS

| | | | |
|---|---|---|---|
| 4,826,468 | 5/1989 | Friedrichs | 474/111 |
| 4,832,664 | 5/1989 | Groger et al. | 474/111 |
| 4,874,352 | 10/1989 | Suzuki | 474/110 |
| 4,921,472 | 5/1990 | Young | 474/111 |
| 4,976,659 | 12/1990 | Hans et al. | 474/111 |
| 5,006,095 | 4/1991 | Suzuki | 474/111 |
| 5,045,032 | 9/1991 | Suzuki et al. | 474/140 |
| 5,055,088 | 10/1991 | Cradduck et al. | 474/140 |
| 5,647,811 | 7/1997 | Mott | 474/111 |
| 5,776,024 | 7/1998 | White et al. | 474/111 |
| 5,820,502 | 10/1998 | Schulze | 474/111 |
| 5,868,638 | 2/1999 | Inoue et al. | 474/111 |

FOREIGN PATENT DOCUMENTS 2261276  5/1993  United Kingdom .

*Primary Examiner*—David A. Bucci
*Assistant Examiner*—Matthew A. Kaness
*Attorney, Agent, or Firm*—Dann, Dorfman, Herrell and Skillman, p.C.; Henry H. Skillman

[57] ABSTRACT

To provide a tensioner lever having a shoe made of resin is molded to prevent distortion of the shoe and increase the precision of shape and reduce the power loss caused by the abrasion of the shoe surface by friction with the chain. A tensioner lever (1) in which a shoe (3) made of resin in sliding contact with a chain is secured to a lever base (2) made of metal having a proximal end (2A) is supported rotatably about a pivotal axis so that an extreme end (2B) can be pivoted, wherein a portion of the shoe (3) having a large wall-thickness is formed with cored-out portions (3F, 3H) whereby when the shoe is molded, the resin for material thereof uniformly flows within a mold, a curing speed of the whole shoe (3) is made uniform, and distortion when molding is prevented to enhance the shape precision of the shoe (3) and the mounting precision to the lever base (2).

7 Claims, 6 Drawing Sheets

TENSIONER LEVER WITH RESIN SHOE

FIELD OF THE INVENTION

The present invention relates to a construction of a tensioner lever used for a timing chain or the like of the engine.

BACKGROUND OF THE INVENTION

For the timing chain or the like of the engine, a tensioner device has been heretofore extensively used in order to prevent a deflection when the chain runs. Tension is applied to the chain by a tensioner lever to take up the slack thereof.

FIGS. 6 and 7 show an example of a prior art tensioner device having a tensioner lever used for the timing chain of the engine. A chain 13 is stretched over a sprocket 10 on the driving side secured to a crank shaft of the engine and sprockets 11, 12 on the driven side at least one of which is secured to a cam shaft. Rotation of the crankshaft is transmitted from the drive sprocket 10 to the driven sprockets 11, 12 through the chain 13 whereby the cam shaft is rotatively driven. Between the drive sprocket 10 and the driven sprocket 12, the chain has a slack run. Between the driven sprocket 11 and the drive sprocket 10, the chain has a tension run.

A tensioner device 14 is arranged on the slack run of the chain 13 for taking up the slack to prevent the deflection during the running. The tensioner device 14 comprises a tensioner lever 16 supported pivotally about a pivot pin 15 so as to press against the slack run of the chain 13 to apply tension to the chain 13, and the device includes tensioner 18 having a plunger 17 for pressing the tensioner lever 16 against the chain 13.

As shown in FIG. 7, the tensioner lever 16 has a lever base 19 made of metal formed by bending a thick metal plate, and a shoe 20 made of resin is fixed in close contact with the surface of the lever base 19 confronting the chain 13. A proximal end portion 19A of the lever base 19 is shaped into a loop, into which is inserted a hollow cylindrical collar 21 made of metal pivotally fitted over the pivot pin 15. Further, the lever base 19 has a curved offset portion 19B locally curved on the side opposite to that confronting the chain 13 so that the extreme end of the plunger 17 shown in FIG. 6 comes in contact therewith. The overall shape of the lever base 19 is in an elongated arcuate shape in the form of a bow on the side confronting the chain 13.

On the other hand, a shoe 20 is secured to the lever base 19. The exposed side of a shoe surface 20A is in sliding contact with the chain 13. The shoe 20 is mounted in close contact with the surface of the metal plate 19 confronting the chain 13. In the curved offset portion 19B of the lever base 9, the shoe has a wall thickness which causes the exposed surface 20A to follow the arcuate shape of the plate 19, and a pad portion 20B whose surface confronting the plate surface conforms in contour to the contour of the curved portion 19B. The wall-thickness T between the exposed shoe surface 20A of that portion and the surface of the shoe confronting the lever base 19 on the side opposite thereof is considerably thicker than other portions. Further, the shoe 20 has a wall-thickness formed to be slightly thicker also in the periphery of the proximal end portion 19A of the lever base 19 bent along the outer peripheral surface of the metal collar 21 than other portions.

However, in the conventional shoe made of resin, in the portion which surrounds the periphery of the proximal end portion of the lever base to which are secured the pad portion and the metal collar, the thickness between the shoe surface and the surface in contact with the lever base on the back surface thereof is thicker than other portions. Therefore, when the shoe is subjected to molding, the flow of resin and the curing speed are not uniform, and may produce a distortion in the shape thereof, making it difficult to obtain a shape accurately adapted to the contour of the lever base. This poses a problem in that the shoe surface in sliding contact with the chain when assembled to the tensioner lever becomes inclined with respect to the pivotal surface of the tensioner lever which pivots about the pivot pin to produce a local abrasion on the shoe surface and to increase a friction between the shoe surface and the chain, resulting in a power loss.

SUMMARY OF THE INVENTION

In view of the foregoing, the present invention solves the problem of prior art as mentioned above, and has its object to provide a tensioner lever which can prevent a distortion when the shoe made of resin is molded to increase the precision of shape and reduce the power loss caused by the abrasion of the shoe surface and the friction with the chain.

For achieving the aforementioned object, according to the present invention, there is provided a tensioner lever in which a shoe made of resin in sliding contact with a chain is secured to a lever base having a proximal end side is supported rotatably about a pivotal axis so that the free end side can be pivoted, wherein a portion of the shoe having a large wall-thickness is formed with a cored-out portion for preventing distortion when the shoe is molded.

The cored-out portion is formed in the portion of the shoe having a large wall-thickness, whereby when the shoe is molded, the resin material may uniformly flow within the mold, and the different portions of the resin are cooled uniformly and efficiently. As a result, the curing speed is uniform in the different portions of the shoe, and the precision in shape of the shoe is enhanced and the mounting precision with respect to the lever base is enhanced.

BRIEF DESCRIPTION OF THE DRAWINGS

All of the objects of the present invention are more fully set forth hereinafter with reference to the accompanying drawings, wherein.

DESCRIPTION OF THE PREFERRED EMBODIMENTS

The embodiments of the present invention will be described hereinafter with reference to the drawings. A tensioner lever 1 is constituted by securing a shoe 3 made of resin to a lever base 2 made of metal formed by bending or otherwise forming a thick plate made of metal.

Figure 6:
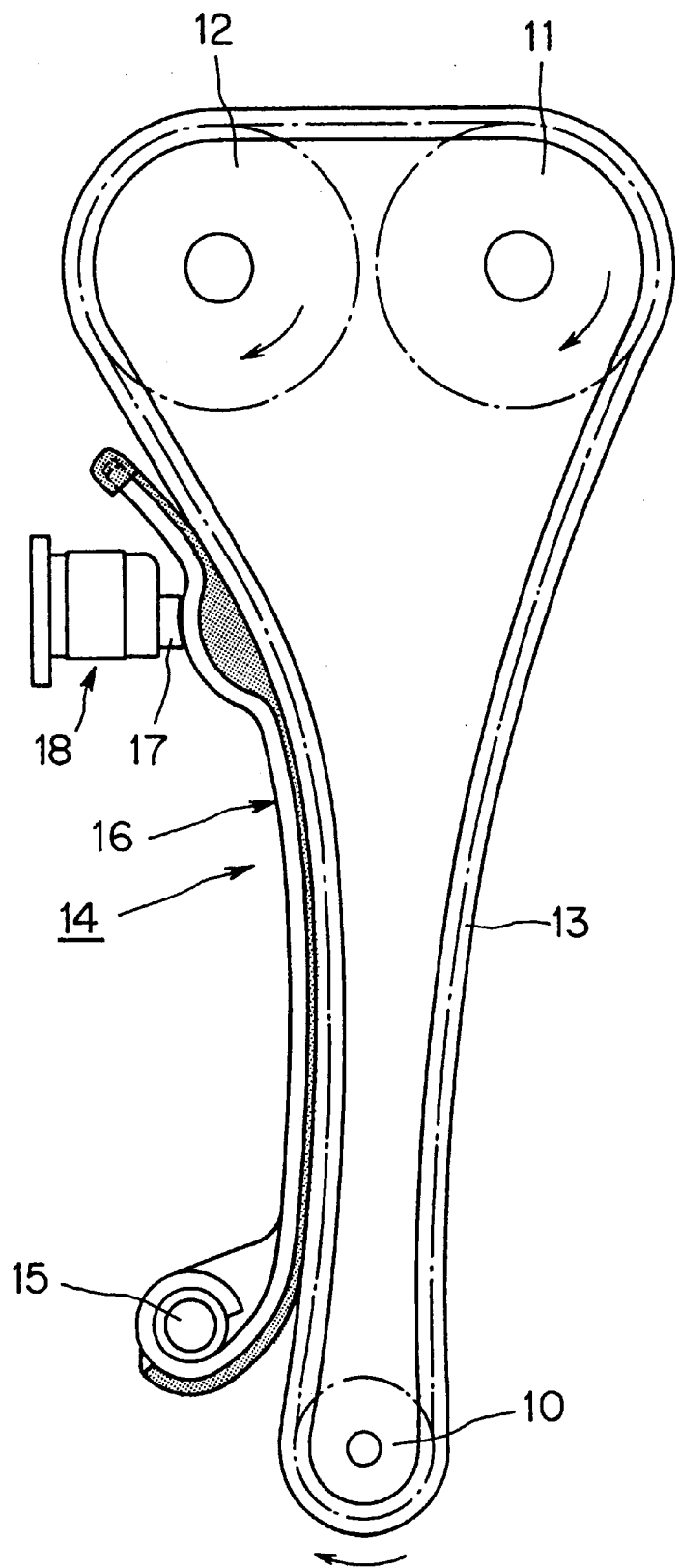
FIG. 6 is a view showing an example of a conventional prior art tensioner device having a tensioner lever.
Figure 7:
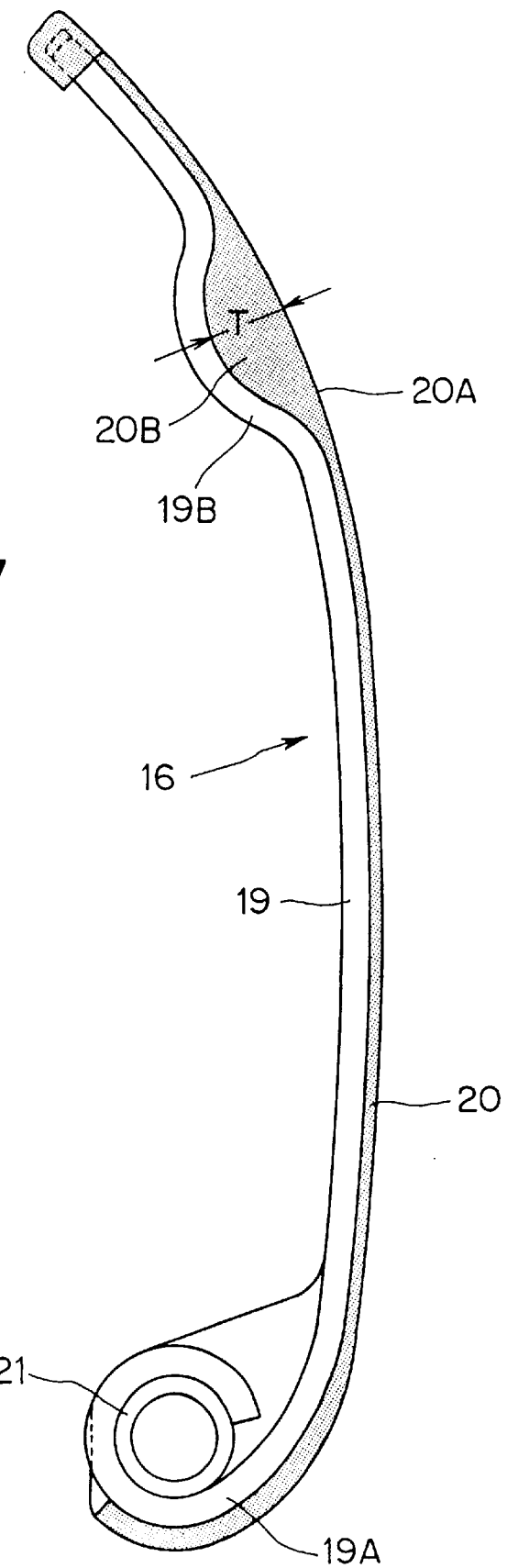
FIG. 7 is a side view of the conventional tensioner lever shown in FIG. 6.

The lever base 2 is not different in construction from the lever base used for a conventional tensioner lever shown in FIGS. 6 and 7 described previously. The metal plate of the lever 2 has a generally arcuate shape, with an elongated offset portion extending along the length of the plate spaced from the free end of the lever 2. The offset portion forms a recess. The plate has opposite side edges extending generally parallel to one another along the generally arcuate shape. A proximal end portion 2A of the lever base 2 is formed into a loop, into which is inserted a hollow cylindrical collar 4 made of metal pivotally fitted over a pivot pin mounted on the engine side not shown. A curved offset portion 2C adjacent the free end registers with a plunger of a suitable bias means, which comes into contact with the offset between its ends in a position close to the free end portion 2B of the lever 2.

On the other hand, in the shoe 3, the back surface of a shoe surface 3A in sliding contact with the chain is mounted in close contact with the surface of the lever base 2 on the chain side, and an extreme end receiving portion is formed integral with the extreme end portion of the shoe 3 having a pocket 3B which is fitted on the extreme terminal end 2B of the lever base 2. The shoe has an arcuate surface confronting the slack run of the chain which follows the arcuate contour of the plate 2. To this end, the shoe has a uniform wall thickness T2 beyond the opposite ends of the offset portion 2C.

Figure 3:
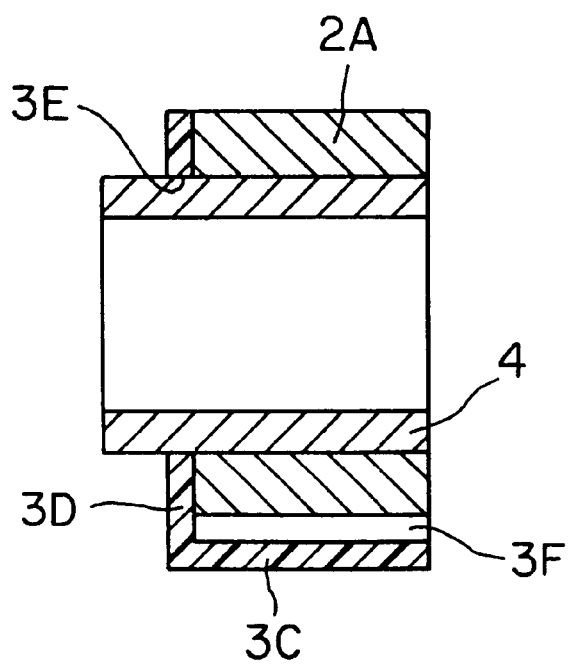
FIG. 3 is a sectional view as viewed from the line B—B of FIG. 1.

Further, an extreme end portion 3C of the shoe 3 is formed to conform to the outer peripheral surface of the proximal end portion 2A of the lever base 2, which is curved in the form of a loop, and a plate-like portion 3D is integrally provided contiguous to an end edge of the proximal end portion 3C on the side confronting a mounting surface on the engine side (not shown) on which the tensioner lever 1 is supported. As shown in FIG. 3, the plate-like portion 3D is placed in contact with the end edge on the side confronting the mounting surface on the engine side of the proximal end portion 2A of the lever base 2, and formed with a collar insert hole 3E through which the outer peripheral surface of the metal collar 4 extends in a manner of close contact. In this way, a physical anchor is provided between the shoe 3 and the plate 2. The pocket 3B at the free end of the shoe holds the shoe on the terminal end 2B, and the insert hole 3E at the proximal end of the shoe anchors the shoe to the plate by means of the collar 4.

In the proximal end portion 3C of the shoe 3, a wall-thickness T1 between the outer surface continuous to the shoe surface 3A and the surface in contact with the outer peripheral surface of the proximal end portion 2A of the lever base 2 on the back side thereof is formed to be thicker than the wall-thickness T2 of the intermediate portion in a longitudinal direction of the shoe 3, and the surface confronting the lever base 2 is formed with slit-like cored-out parts at short intervals in a longitudinal direction of the shoe 3. As shown, the plurality of slits 3F extend transversely between the opposite side edges of the plate, reducing the amount of resin material in the wall thickness T1.

Figure 2:
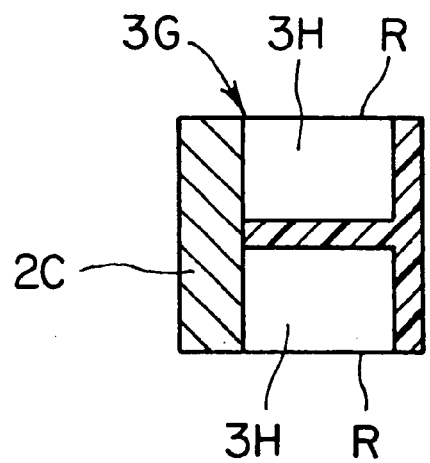
FIG. 2 is a sectional view as viewed from the line A—A of FIG. 1.

In the curved offset portion 2C of the lever base 2, a pad portion 3G is formed to fit in the back of the shoe surface 3A. As shown in FIG. 2, the pad 3G is circularly recessed along the contour thereof, as shown at 2C. In the pad portion 3G, many cored-out portions 3H are formed extending inwardly from both edges of the lever base 2, to form a comb-like rib R and the end surface of the teeth formed by these cored-out portions 3H is supported in contact with the curved offset portion 2C of the lever base 2. The back of the comb-like rib R forms the continuous arcuate surface of the shoe which bears against the chain.

The cored-out portions 3F, 3H are formed in the portions of the shoe 3 having a large wall-thickness, whereby the substantial wall-thickness in the large wall-thickness portion of the shoe 3 is reduced, and the differential between these wall thicknesses and the wall-thickness in other portions can be reduced. When the shoe 3 made of resin is manufactured by injection molding, the flow of resin within the mold is made uniform and the curing speed of resin is made uniform to prevent distortion of the shape of the shoe after being cured.

Figure 1:
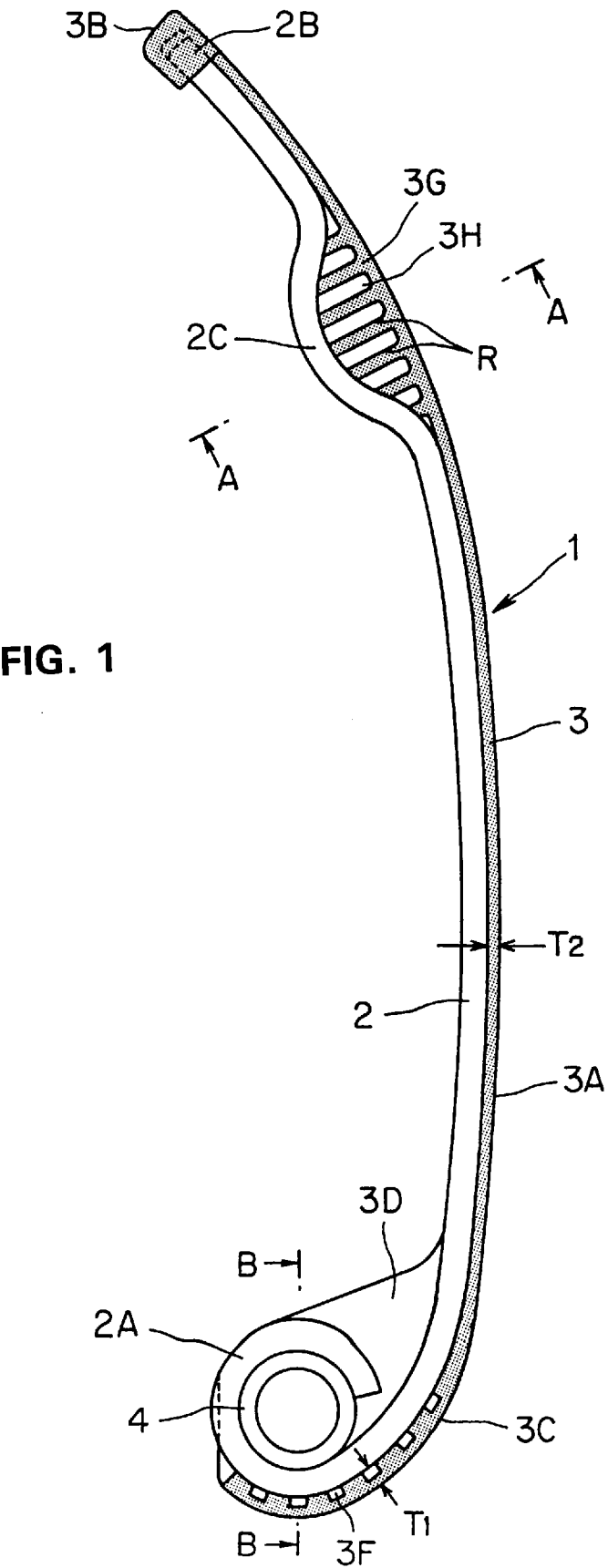
FIG. 1 is a side view showing a first embodiment of a tensioner lever for a chain according to the present invention.
Figure 4:
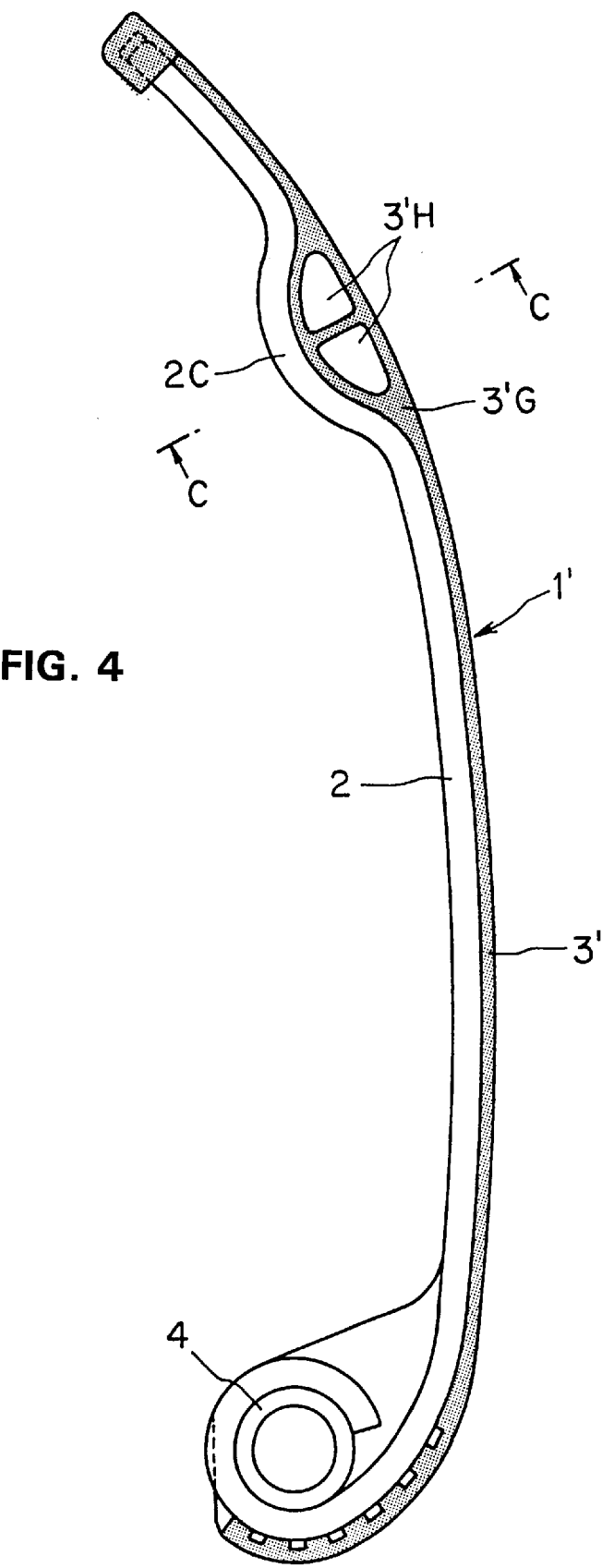
FIG. 4 is a side view showing a second embodiment of a tensioner lever for a chain according to the present invention.
Figure 5:
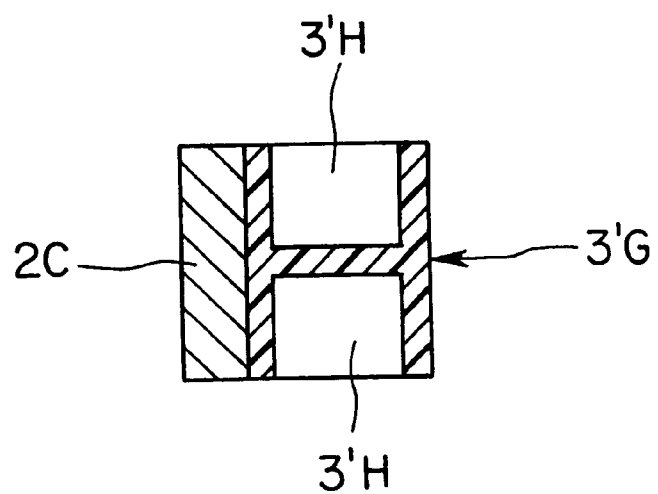
FIG. 5 is a sectional view as viewed from the line C—C of FIG. 5.

FIGS. 4 and 5 show a second embodiment of tensioner of the present invention. In these drawings, parts indicated by the same numerals and symbols as those of FIGS. 1 to 3 have the same construction as those of the first embodiment.

That is, a tensioner lever 1' of the present embodiment is different from the tensioner lever 1 of the first embodiment described above only in the construction of a cored-out portion 3'H formed in a pad portion 3G' of a shoe 3'. As shown in FIGS. 4 and 5, the cored-out portion 3'H constitutes a hollow structure formed by voids arranged two-by-two on both sides of a rib extending between the inner and outer surfaces of the pad portion 3'G, simplifying the shape as compared with the cored-out portion 3G in the above-described first embodiment. The inner surface engages the plate offset 2C and the outer surface constitutes a part of the continuous arcuate surface of the shoe 3'.

It is noted that the shape of the cored-out portion provided in the shoe of the tensioner lever according to the present invention is constructed so that the difference in wall thickness of the shoe is reduced, and when the shoe is molded, the flow of resin can be made uniform. Further, any shape will suffice if distortion is not produced after curing and the curing speed is made uniform.

As described above, according to the present invention, since cored-out portions are provided in the thick wall portions of the shoe, when the shoe made of resin material is molded, the flow of the resin material is made uniform and the curing speed of the resin material is made uniform to prevent the distortion of the shape of the shoe after curing.

As a result, the precision of the shape of the shoe is enhanced, precision with respect to the lever base is enhanced, and inclined contact of the shoe surface with the chain can be prevented. Therefore, no local abrasion occurs in the shoe surface, and the power loss caused by the sliding friction between the chain and the shoe surface can be reduced.

Further, since by the provision of the cored-out portions, the surfaces of the shoe providing radiating areas for frictional heat generated when the chain slidably moves, are increased to enhance the cooling efficiency of the shoe. Early abrasion of the shoe surface caused by deterioration of resin caused by heat can be prevented, and the quantity of resin materials used for the shoe can be saved. Therefore, the tensioner lever can be produced at lower cost and reduced in weight.

While particular embodiments of the invention have been herein illustrated and described, it is not intended to limit the invention to such disclosures, but changes and modifications may be made therein and thereto within the scope of the following claims.

I claim:

1. A tensioner lever comprising a shoe made of resin adapted to be mounted in sliding contact with a chain, a lever base made of metal having a proximal end side and an extreme end side, said proximal end side being adapted to be supported rotatably about a pivotal axis so that said extreme end side can be pivoted, said lever base having a curved offset portion close to said extreme end side adapted to engage a tensioner for pressing the lever shoe against the chain, said offset portion forming a recess, said shoe having at least one portion with a small wall thickness and at least one portion with a large wall thickness engaged within said recess of the lever base, characterized in that said portion of the shoe having a large wall-thickness is formed with cored-out portions for preventing distortion when the shoe is molded.

2. For a timing chain in an engine having a drive sprocket and at least one driven sprocket, the timing chain being stretched over the sprockets to provide a tension run and a slack run on opposite sides of the drive sprocket, a tensioner comprising a tensioner lever having a proximal end pivotally mounted adjacent the slack run of the chain and a free end to swing toward said slack run, said lever comprising a metal base having a surface confronting the slack run, and a shoe of molded resin material mounted on said surface of said metal base, and bias means engaging said metal base on a surface opposite said confronting surface at the free end of said lever, said bias means urging said lever toward the slack run, said metal base comprising an elongated plate having a generally arcuate shape with a pivotal mounting at the proximal end and an offset curved portion spaced longitudinally from the free end, said offset portion projecting toward and engaging said bias means and forming a recess in said generally arcuate shape of said plate on said confronting surface, said recess having spaced-apart ends within said arcuate shape, said shoe having a uniform arcuate surface confronting said slack run, providing a one wall thickness along said plate beyond the spaced-apart ends of said recess, and a larger wall thickness within said recess, said shoe having cored-out portions in said larger wall thickness to prevent distortion in said molded resin material.

3. A tensioner according to claim 2, wherein said plate has opposite side edges extending longitudinally along said arcuate shape, said shoe cored-out portions being formed adjacent said plate and extending inwardly of said opposite side edges into the interior of said large wall thickness to produce a comb-like rib having teeth engaging said plate and a back comprising a continuous surface constituting said arcuate surface of said shoe along the length of said recess.

4. A tensioner according to claim 2, wherein said plate has opposite side edges extending longitudinally along said arcuate shape, said shoe cored-out portions being spaced from said plate and extending inwardly from said opposite side edges in to the interior of said large wall thickness to produce hollow structure having a first surface engaging said plate and a second surface constituting said arcuate surface of said shoe along the length of said recess, said hollow structure having a rib extending between said first and second surfaces.

5. A tensioner according to claim 2, wherein said plate has opposite side edges extending longitudinally along said arcuate shape and into said proximal end, said shoe having a large wall thickness in an end portion overlying said proximal end of the plate, said end portion having cored-out portions in the form of a plurality of slits in the large wall thickness extending transversely between opposite side edges of the plate.

6. A tensioner according to claim 2 wherein said plate has a free terminal beyond the outer end of said offset curved portion, said shoe having a pocket at said free end to engage over said free terminal.

7. A tensioner according to claim 6 including a collar at the proximal end of the plate providing said pivotal mounting, said shoe having a plate-like portion at its proximal end, said plate-like portion having an insert hole engaging said collar to anchor said proximal end to said plate.

* * * * *

UNITED STATES PATENT AND TRADEMARK OFFICE
CERTIFICATE OF CORRECTION

PATENT NO. : 6,086,498
DATED : July 11, 2000
INVENTOR(S) : Hashimoto

It is certified that error appears in the above-identified patent and that said Letters Patent is hereby corrected as shown below:

Title Page,
Under, "[30] Foreign Application Priority Data"
"Mar. 24, 1997" should be -- Mar. 27, 1997 --.

Signed and Sealed this

Fourteenth Day of August, 2001

Attest:

*Attesting Officer*

NICHOLAS P. GODICI
*Acting Director of the United States Patent and Trademark Office*